(12) United States Patent
Sutardja

(10) Patent No.: US 8,775,854 B2
(45) Date of Patent: Jul. 8, 2014

(54) CLOCK TURN-ON STRATEGY FOR POWER MANAGEMENT

(75) Inventor: Pantas Sutardja, Los Gatos, CA (US)

(73) Assignee: Marvell World Trade Ltd., St. Michael (BB)

( * ) Notice: Subject to any disclaimer, the term of this patent is extended or adjusted under 35 U.S.C. 154(b) by 581 days.

(21) Appl. No.: 12/941,534

(22) Filed: Nov. 8, 2010

(65) Prior Publication Data

US 2011/0115567 A1    May 19, 2011

Related U.S. Application Data

(60) Provisional application No. 61/261,181, filed on Nov. 13, 2009.

(51) Int. Cl.
*G06F 1/00* (2006.01)
*G06F 21/50* (2013.01)

(52) U.S. Cl.
CPC ..................................... *G06F 21/50* (2013.01)
USPC .......................................................... 713/500

(58) Field of Classification Search
CPC ...................................................... G06F 21/50
USPC .......................................... 713/320–340, 500
See application file for complete search history.

(56) References Cited

U.S. PATENT DOCUMENTS

| 6,026,498 | A | * | 2/2000 | Fuse et al. ...................... 713/600 |
| 6,061,803 | A | * | 5/2000 | Ayache .......................... 713/501 |
| 6,118,315 | A | | 9/2000 | Guedj |
| 6,429,704 | B1 | * | 8/2002 | Kanai et al. .................... 327/113 |
| 7,302,598 | B2 | * | 11/2007 | Suzuki et al. ................. 713/320 |
| 2002/0038435 | A1 | * | 3/2002 | Akamatsu et al. ............ 713/600 |
| 2005/0022042 | A1 | | 1/2005 | Tam et al. |
| 2005/0110545 | A1 | | 5/2005 | Mahrla |
| 2005/0212571 | A1 | | 9/2005 | Om et al. |

FOREIGN PATENT DOCUMENTS

EP    1 608 067    12/2005

OTHER PUBLICATIONS

The International Search Report and Written Opinion for corresponding International Application No. PCT/US2010/056509, dated Jul. 12, 2011, 15 pages.
Invitation to Pay Additional Fees and Annex to Form PCT/ISA/206 for corresponding International Application No. PCT/US2010/056509 dated Mar. 25, 2011.

\* cited by examiner

*Primary Examiner* — Kim Huynh
*Assistant Examiner* — Alyaa T Mazyad

(57) ABSTRACT

A system includes a voltage sensing module and a frequency adjustment module. The voltage sensing module is configured to sense a supply voltage of a circuit block, generate a first control signal when the supply voltage is less than or equal to a first voltage, and generate a second control signal when the supply voltage is within a predetermined range of a second voltage. The frequency adjustment module is configured to set a frequency of a clock signal supplied to the circuit block to less than a normal operating frequency of the circuit block when the supply voltage is initially supplied to the circuit block after a power on reset operation and the first control signal or the second control signal is received.

6 Claims, 4 Drawing Sheets

CLOCK TURN-ON STRATEGY FOR POWER MANAGEMENT

CROSS-REFERENCE TO RELATED APPLICATIONS

This application claims the benefit of U.S. Provisional Application No. 61/261,181, filed on Nov. 13, 2009. The disclosure of the above application is incorporated herein by reference in its entirety.

FIELD

The present disclosure relates to power management systems used in computing devices.

BACKGROUND

The background description provided herein is for the purpose of generally presenting the context of the disclosure. Work of the presently named inventor, to the extent the work is described in this background section, as well as aspects of the description that may not otherwise qualify as prior art at the time of filing, are neither expressly nor impliedly admitted as prior art against the present disclosure.

Computing devices typically include circuit blocks that perform predetermined functions. Depending on functions performed by a computing device at a given time, a circuit block may or may not be in use at the given time. The unused circuit block, however, may continue to consume power. Power gating and/or clock gating are some of the techniques used to control power consumed by unused circuit blocks.

Power gating is a technique used to reduce leakage power. Unused circuit blocks are temporarily shut down (i.e., turned off) to reduce the overall leakage power. The temporary shutdown is called a low power mode or an inactive mode. When the circuit blocks are required for operation again, the circuit blocks are turned on (i.e., activated to an active mode). These two modes are switched at appropriate times and in a suitable manner to maximize power performance while minimizing impact on speed performance.

Clock gating is a power-saving technique used in synchronous circuits. In synchronous circuits, a clock distribution network distributes one or more clock signals from a common point to all the elements that use the one or more clock signals. When the clock distribution network forms a tree, the clock distribution network is called a clock tree.

To save power, clock gating logic is added to a clock tree. The clock gating logic disables circuits by turning off clock supply to the circuits so that flop-flops in the circuits do not change state. Power that would otherwise be consumed due to switching of the flip-flops reduces to nearly zero, and only leakage currents are incurred.

Generally, if the clock gating logic is not used, circuit elements such as multiplexers can be used to control clock distribution. These circuit elements, however, require additional control logic. These circuit elements and associated control logic dissipate additional power and occupy additional area on a chip.

In contrast, the clock gating logic dissipates less power and occupies less area on a chip than circuit elements such as multiplexers and associated control logic. can be used. Accordingly, to save power and chip area, clock gating can be used instead of multiplexers and associated control logic.

SUMMARY

A system includes a voltage sensing module and a frequency adjustment module. The voltage sensing module is configured to sense a supply voltage of a circuit block, generate a first control signal when the supply voltage is less than or equal to a first voltage, and generate a second control signal when the supply voltage is within a predetermined range of a second voltage. The frequency adjustment module is configured to set a frequency of a clock signal supplied to the circuit block to less than a normal operating frequency of the circuit block when the supply voltage is initially supplied to the circuit block after a power on reset operation and the first control signal or the second control signal is received.

In other features, the frequency adjustment module is configured to set the frequency of the clock signal supplied to the circuit block to the normal operating frequency when a predetermined time has elapsed after the first control signal or the second control signal is received and the second control signal is received.

In other features, the frequency adjustment module is configured to switch the frequency from the normal operating frequency to the less than normal operating frequency when the first control signal is received again, and switch the frequency from the less than normal operating frequency to the normal operating frequency when the second control signal is received again.

In still other features, a system includes a voltage sensing module and a frequency adjustment module. The voltage sensing module is configured to sense a supply voltage of a circuit block, generate a first control signal when the supply voltage is less than or equal to a predetermined voltage, and generate a second control signal when the supply voltage is within a predetermined range of a rated value of the supply voltage. The frequency adjustment module is configured to set a frequency of a clock signal supplied to the circuit block to less than a normal operating frequency of the circuit block when the first control signal is received, and set the frequency of the clock signal to the normal operating frequency when the second control signal is asserted.

In other features, the frequency adjustment module is configured to switch the frequency from the normal operating frequency to the less than normal operating frequency when the first control signal is received again, and switch the frequency from the less than normal operating frequency to the normal operating frequency when the second control signal is received again.

In still other features, a method includes sensing a supply voltage of a circuit block, generating a first control signal when the supply voltage is less than or equal to a first voltage, and generating a second control signal when the supply voltage is within a predetermined range of a second voltage. The method further includes setting a frequency of a clock signal supplied to the circuit block to less than a normal operating frequency of the circuit block when the supply voltage is initially supplied to the circuit block after a power on reset operation, and the first control signal or the second control signal is received.

In other features, the method further includes setting the frequency of the clock signal supplied to the circuit block to the normal operating frequency when a predetermined time has elapsed after the first control signal or the second control signal is received, and the second control signal is received.

In other features, the method further includes switching the frequency from the normal operating frequency to the less than normal operating frequency when the first control signal is received again, and switching the frequency from the less than normal operating frequency to the normal operating frequency when the second control signal is received again.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

The present disclosure will become more fully understood from the detailed description and the accompanying drawings, wherein.

DESCRIPTION

Figure 1A:
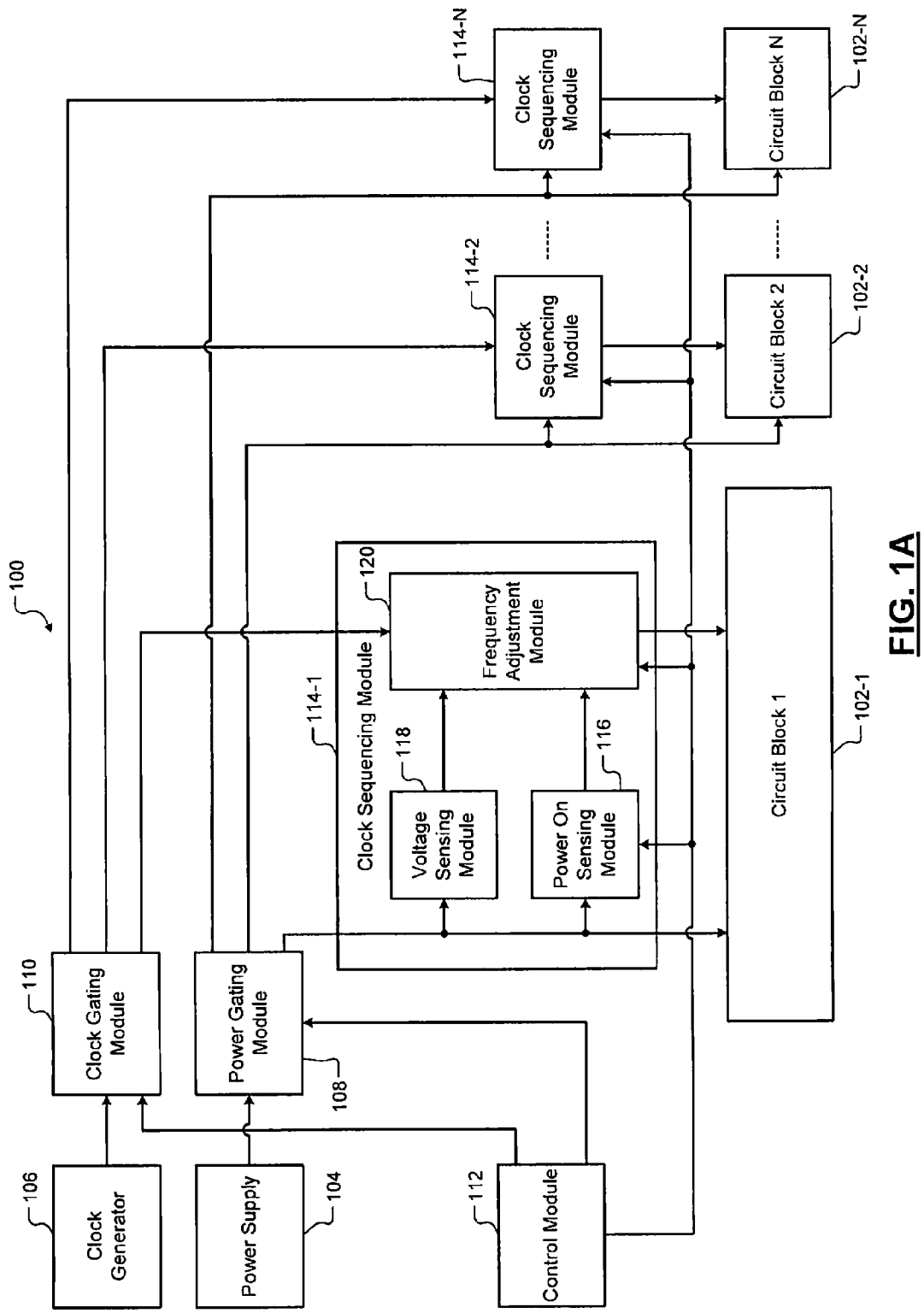
FIG. 1A is a functional block diagram of a system for sequencing clock signals of a circuit block.

The following description is merely illustrative in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical OR. It should be understood that steps within a method may be executed in different order without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The speed at which a computing device processes data depends on a combination of a supply voltage and an operating frequency of the computing device. In general, higher supply voltages afford higher operating frequencies. Often, there is a trade-off between the supply voltage (and hence the power dissipation) of the computing device and the operating frequency of the computing device. To reduce operating power, the supply voltage is often set to a minimum value required for a given operating frequency. Doing so, however, leaves little margin for any power supply disturbance.

To further reduce the operating power, many circuit blocks are designed to shutdown through power gating and/or clock gating. Modulating power consumption using power gating and/or clock gating, however, can vary the supply voltage widely. During transient operations, the lowest value of the supply voltage determines the maximum operating frequency.

To provide margins against voltage transients during power up/power down of circuit blocks, the supply voltage is often set to a slightly higher voltage. Doing so, however, increases the baseline power dissipation of the device, thereby negating the power savings provided by power gating and/or clock gating.

Most circuit blocks can turn on gradually to minimize power disturbances. However, power disturbances to a circuit block may be caused by turn-on characteristics of other blocks. For example, the power disturbances may be caused when other circuit blocks turn on simultaneously and/or when circuit blocks having wide speed margins do not turn on gradually.

The present disclosure relates to systems and methods that monitor the power disturbances caused to a circuit block and that adjust the operating frequency of the circuit block based on the power disturbances. Accordingly, the systems and methods disclosed herein allow for aggressive/extensive power gating and/or clock gating while using minimum supply voltage.

Specifically, a voltage sensing module is used to sense the supply voltage of a circuit block. The voltage sensing module generates a first control signal when the supply voltage is less than or equal to a predetermined voltage (i.e., when a supply-low condition is sensed). The voltage sensing module generates a second control signal when the supply voltage is within a predetermined range of a rated value of the supply voltage (i.e., when a supply-valid condition is sensed).

The second control signal remains asserted as long as the supply voltage stays within the predetermined range of the rated value of the supply voltage (i.e., as long as the supply-valid condition exists). Accordingly, when the second control signal is not generated or asserted, a supply-invalid condition is indicated. In some implementations, the supply-invalid condition may be indicated when both the first control signal and the second control signal are not generated.

The voltage sensing module may use hysteresis to sense the supply voltage. For example, the voltage sensing module may generate the first control signal when the supply voltage is lower than the voltage at which the second control signal is generated. In other words, the predetermined voltage may be less than the rated value of the supply voltage.

A power up clocking sequence is provided for the circuit block based on the first control signal and the second control signal. Specifically, when the circuit block is initially turned on after a power on reset operation, the clock to the circuit block is turned on only after receiving the first control signal or the second control signal. After receiving the first control signal or the second control signal, the frequency of the clock is set lower than a nominal target frequency. For example, the frequency is set 20% lower than the nominal target frequency. For simplicity of design, the frequency may be set to an integer sub-multiple (i.e., 1/X, where X is an integer greater than 1) of the nominal target frequency. Subsequently, after a programmable period of time elapses, the frequency is set to the nominal target frequency if the second control signal is asserted.

At any time after the initial turn on sequence described above, the following auto-sequencing is performed. If the first control signal is detected again, the frequency is automatically set to the lower frequency. Thereafter, when the second control signal is asserted again, the frequency is reset to the nominal target frequency.

In some implementations, the initial power up clocking sequence may be skipped and instead the auto-sequencing can be directly performed when the circuit block is initially turned on after a power on reset operation. Doing so potentially enables the circuit block to operate at full speed when the circuit block is initially turned on after a power on reset operation since the frequency of the clock can be set directly to the nominal target frequency. The supply voltage, however, may drop due to such a turn-on, which in turn may cause other circuit blocks to perform auto-sequencing.

Figure 1B:
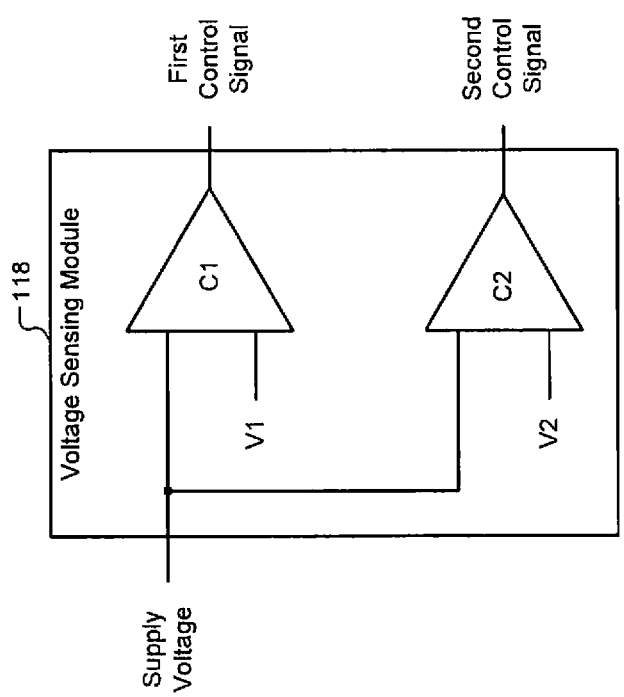
FIG. 1B is a schematic of a voltage sensing module.

Referring now to FIGS. 1A and 1B, a system 100 for sequencing clock of a circuit block according to the present disclosure is shown. The system 100 includes a plurality of circuit blocks 102-1, 102-2, ..., and 102-N (collectively circuit blocks 102), where N is an integer greater than 1. The system 100 further includes a power supply 104, a clock generator 106, a power gating module 108, a clock gating module 110, and a control module 112.

Additionally, the system 100 includes clock sequencing modules 114-1, 114-2, ..., and 114-N (collectively clock sequencing modules 114) that sequence clock signals of the respective circuit blocks 102. In some implementations, the circuit blocks 102 may include the respective clock sequencing modules 114.

The power supply 104 supplies power to the circuit blocks 102. The clock generator 106 generates clock signals used by the circuit blocks 102. The power gating module 108 uses power gating techniques to control power supplied to the circuit blocks 102. The clock gating module 110 uses clock gating techniques to control clock signals used by the circuit blocks 102. Both clock gating and power gating will be described in detail below.

The control module 112 controls the power gating module 108 and the clock gating module 110. For example, the control module 112 determines power gating and clock gating schemes used by the power gating module 108 and the clock gating module 110.

The clock sequencing module 114-1 is now described in detail. Other clock sequencing modules 114 operate in a manner similar to the clock sequencing module 114-1. Accordingly, to avoid repetition, the other clock sequencing modules 114 are neither shown in detail in FIG. 1 nor described in detail.

The clock sequencing module 114-1 includes a power on sensing module 116, a voltage sensing module 118, and a frequency adjustment module 120. The power on sensing module 116 senses when power is initially supplied to the circuit block 102-1 after a power on reset operation. When the circuit block 102-1 is initially turned on after a power on reset operation, the clock to the circuit block 102-1 is turned on only after receiving the first control signal or the second control signal. The voltage sensing module 118 senses the voltage supplied to the circuit block 102-1 by the power gating module 108. The voltage sensing module 118 generates the first control signal and the second control signal.

Specifically, as shown in FIG. 1B, the voltage sensing module 118 includes a first comparator C1 and a second comparator C2. The first comparator C1 compares the supply voltage of the circuit block 114-1 to a predetermined voltage V1. The second comparator C2 compares the supply voltage of the circuit block 114-1 to a second voltage V2. The voltage V2 has a value within a predetermined range of a rated value of the supply voltage of the circuit block 102-1. The predetermined voltage V1 is less than the rated value of the supply voltage of the circuit block 102-1. Additionally, the predetermined voltage V1 is less than the voltage V2.

The first comparator C1 generates the first control signal when the voltage supplied to the circuit block 102-1 is less than or equal to the predetermined voltage V1. The second comparator C2 generates the second control signal when the voltage supplied to the circuit block 102-1 is within a predetermined range of the rated value of the supply voltage of the circuit block 102-1 (e.g., V2). Since the predetermined voltage V1 is less than the rated value of the supply voltage of the circuit block 102-1, the first control signal is generated at a lower voltage than the second control signal.

Setting the value of the predetermined voltage V1 less than the rated value of the supply voltage provides hysteresis. Specifically, when the circuit block 102-1 is initially turned on after a power on reset operation, the clock to the circuit block 102-1 is turned on only after receiving the first control signal or the second control signal. Setting V1 less than the rated value of the supply voltage allows the voltage sensing module 118 to generate the first control signal when the supply voltage is less than the voltage at which the second control signal is generated. Accordingly, when the circuit block 102-1 is initially turned on after a power on reset operation, the clock to the circuit block 102-1 can be turned on after receiving the first control signal or the second control signal because V1 is set less than the rated value of the supply voltage. Thus, setting the value of the predetermined voltage V1 less than the rated value of the supply voltage provides hysteresis.

In FIG. 1A, the frequency adjustment module 120 adjusts the frequency of the clock supplied by the clock gating module 110 to the circuit block 102-1. The frequency adjustment module 120 adjusts the frequency of the clock depending on the value of the voltage supplied by the power gating module 108 to the circuit block 102-1. The frequency adjustment module 120 adjusts the frequency of the clock based on the first control signal and the second control signal.

The frequency adjustment module 120 adjusts the frequency of the clock in two stages. The first stage is called an initial clock sequence stage that occurs when power is initially supplied to the circuit block 102-1 after a power on reset operation. The second stage is subsequent to the first stage and is called an auto-sequencing stage.

In the first stage, when power is initially supplied to the circuit block 102-1 after a power on reset operation, the frequency adjustment module 120 controls the clock output to the circuit block 102-1 as follows. The frequency adjustment module 120 does not output the clock received from the clock gating module 110 to the circuit block 102-1 until the first control signal or the second control signal is received from the voltage sensing module 118. When the first control signal or the second control signal is received, the frequency adjustment module 120 sets the frequency of the clock to a lower frequency that is less than a normal operating frequency of the circuit block 102-1. For example, the lower frequency may be 1/X times the normal operating frequency, where X is an integer greater than 1.

Subsequently, the frequency adjustment module 120 starts a timer that counts a predetermined time. The predetermined time is programmable and can be programmed by the control module 112. After the predetermined time elapses, the frequency adjustment module 120 determines if the second control signal is asserted by the voltage sensing module 118. If the second control signal is asserted, the frequency adjustment module 120 sets the frequency of the clock to the normal operating frequency of the circuit block 102-1.

Thereafter, in the second stage, the frequency adjustment module 120 monitors the first control signal and the second control signal. When the voltage sensing module 118 generates the first control signal, the frequency adjustment module 120 switches the frequency of the clock from the normal operating frequency to the lower frequency. Conversely, when the voltage sensing module 118 generates the second control signal, the frequency adjustment module 120 switches the frequency of the clock from the lower frequency to the normal operating frequency, and so on.

In some implementations, the first stage may be eliminated. The frequency adjustment module 120 controls the frequency of the clock simply based on the first control signal and the second control signal at all times including when power is initially supplied to the circuit block 102-1 after a power on reset operation. Accordingly, the control module 112 may disable the power on sensing module 116 and the timer used by the frequency adjustment module 120.

When power is initially supplied to the circuit block 102-1 after a power on reset operation, the frequency adjustment module 120 may receive the first control signal or the second control signal from the voltage sensing module 118. If the first control signal is received, the frequency adjustment module 120 sets the frequency of the clock to the lower frequency of the circuit block 102-1. Instead, if the second control signal is received, the frequency adjustment module 120 sets the frequency of the clock to the normal operating frequency of the circuit block 102-1.

Subsequently, the frequency adjustment module 120 switches the frequency of the clock from the normal operating frequency to the lower frequency whenever the first control signal is received from the voltage sensing module 118. Conversely, the frequency adjustment module 120 switches the frequency of the clock from the lower frequency to the normal operating frequency whenever the second control signal is received from the voltage sensing module 118, and so on.

Figure 2:
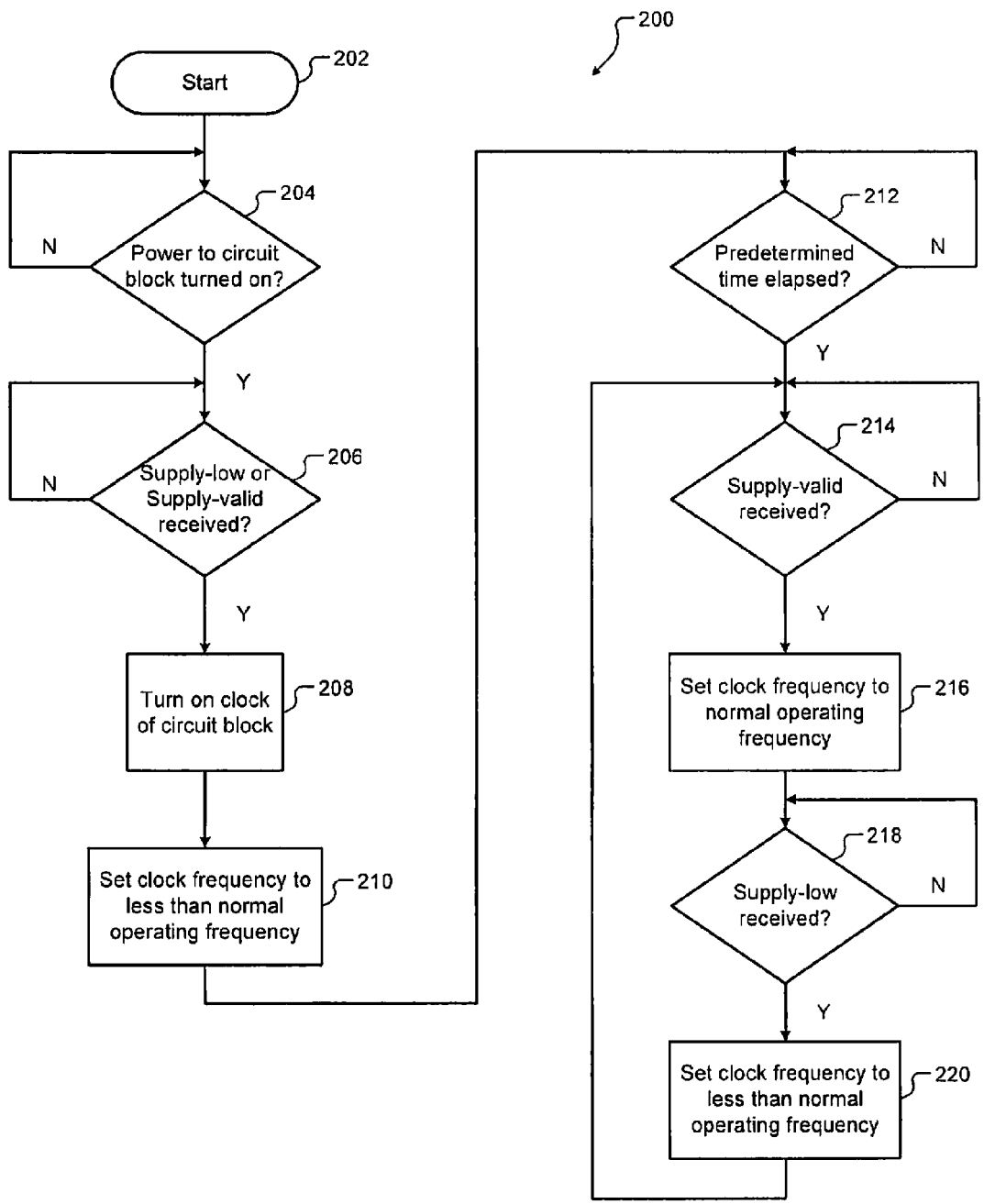
FIG. 2 is a flowchart of a method for sequencing clock signals of a circuit block.

Referring now to FIG. 2, a method 200 for sequencing the clock of the circuit block N (N≥1) according to the present disclosure is shown. Control begins at 202. At 204, control determines if power to the circuit block N is turned on. Control waits until power to the circuit block N is turned on. When power to the circuit block N is turned on, control determines at 206 if the first control signal or the second control signal is received. Control waits until the first control signal or the second control signal is received. When the first control signal or the second control signal is received, control turns on the clock of the circuit block N at 208.

At 210, control sets the frequency of the clock to a lower frequency than the normal operating frequency of the circuit block N. At 212, control determines if a predetermined time has elapsed after the frequency of the clock is set to the lower frequency. Control waits until the predetermined time elapses. At 214, control determines if the second control signal is received. Control waits until the second control signal is received. When the second control signal is received, control sets the frequency of the clock to the normal operating frequency at 216.

At 218, control determines if the first control signal is received again. Control waits until the first control signal is received again. When the first control signal is received again, control sets the frequency of the clock to the lower frequency again. Thereafter, control returns to 214.

Figure 3:
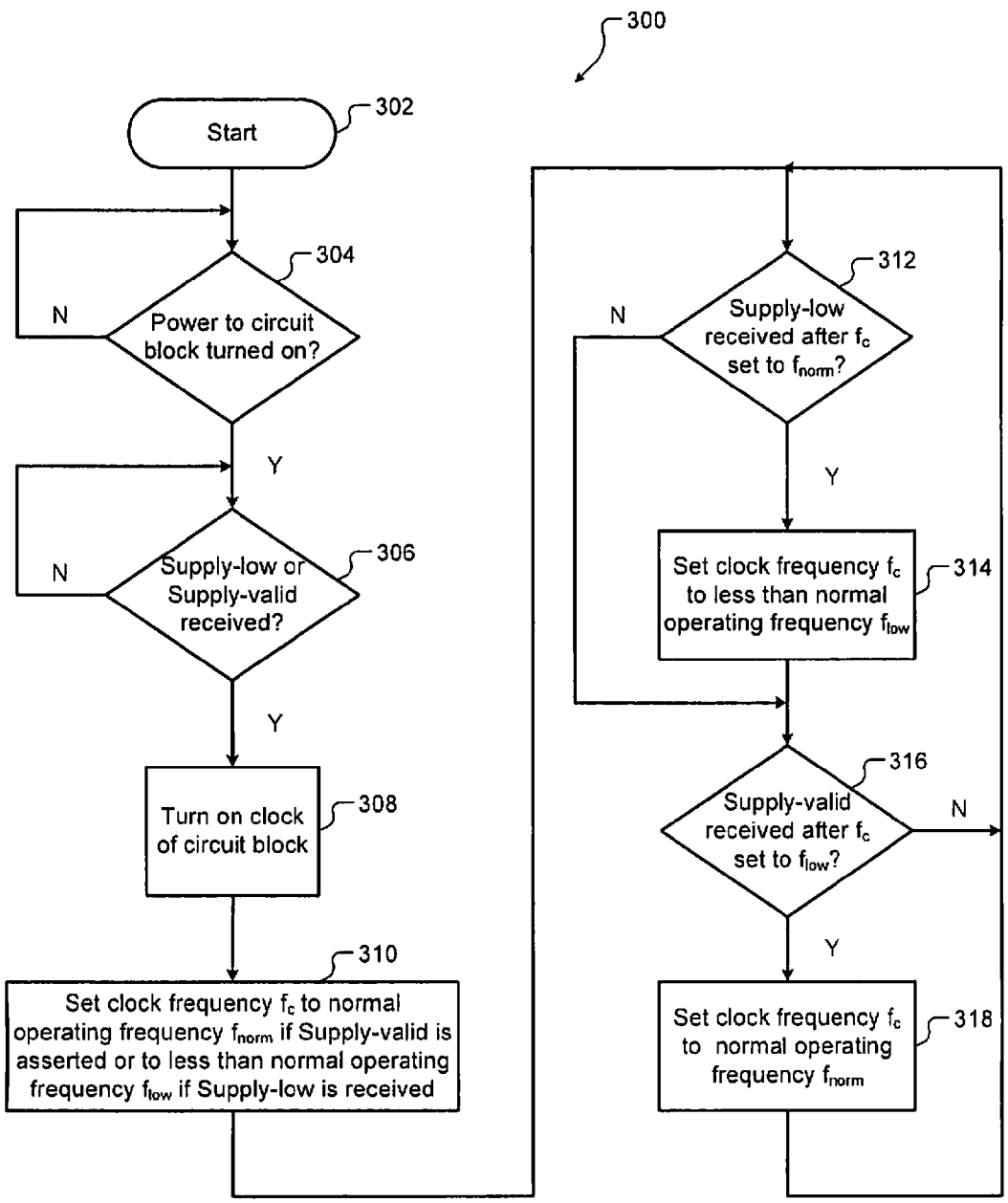
FIG. 3 is a flowchart of a method for sequencing clock signals of a circuit block.

Referring now to FIG. 3, a method 300 for sequencing the clock of the circuit block N (N≥1) according to the present disclosure is shown. Control begins at 302. At 304, control determines whether power to the circuit block N is turned on. Control waits until power to the circuit block N is turned on. When power to the circuit block N is turned on, control determines at 306 if the first control signal or the second control signal is received. Control waits until the first control signal or the second control signal is received. When the first control signal or the second control signal is received, control turns on clock of the circuit block N at 308.

At 310, control sets the frequency of the clock to the normal operating frequency if the second control signal is received. Alternatively, control sets the frequency of the clock to a lower frequency than the normal operating frequency if the first control signal is received.

Subsequently, control determines at 312 if the first control signal is received again after the frequency of the clock is set to the normal operating frequency. When the first control signal is received again, control switches the frequency of the clock from the normal operating frequency to the lower frequency at 314.

Thereafter, or if the first control signal is not received again, control determines at 316 if the second control signal is received again after the frequency of the clock is set to the lower frequency. When the second control signal is received again, control switches the frequency of the clock from the lower frequency to the normal operating frequency at 318. Thereafter, or if the second control signal is not received again, control returns to 312.

The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A system comprising:
    a voltage sensing module configured to
        sense a supply voltage of a circuit block,
        generate a first control signal when the supply voltage is less than or equal to a first voltage, and
        generate a second control signal when the supply voltage is within a predetermined range of a second voltage; and
    a frequency adjustment module configured to
        set a frequency of a clock signal supplied to the circuit block to less than a normal operating frequency of the circuit block, wherein the frequency is greater than zero, when
            (i) the supply voltage is initially supplied to the circuit block after a power on reset operation, and
            (ii) either the first control signal is received or the second control signal is received, and
        set the frequency of the clock signal supplied to the circuit block to the normal operating frequency when
            (i) a predetermined time has elapsed after the first control signal or the second control signal is received, and
            (ii) the second control signal is received.

2. The system of claim 1, wherein the first voltage is less than the second voltage.

3. The system of claim 1, wherein the frequency adjustment module is configured to
    switch the frequency from the normal operating frequency to the less than normal operating frequency when the first control signal is received again, and
    switch the frequency from the less than normal operating frequency to the normal operating frequency when the second control signal is received again.

4. A method comprising:
sensing a supply voltage of a circuit block;
generating a first control signal when the supply voltage is less than or equal to a first voltage;
generating a second control signal when the supply voltage is within a predetermined range of a second voltage;
setting a frequency of a clock signal supplied to the circuit block to less than a normal operating frequency of the circuit block, wherein the frequency is greater than zero, when
  (i) the supply voltage is initially supplied to the circuit block after a power on reset operation, and
  (ii) either the first control signal is received or the second control signal is received; and
setting the frequency of the clock signal supplied to the circuit block to the normal operating frequency when
  (i) a predetermined time has elapsed after the first control signal or the second control signal is received, and
  (ii) the second control signal is received.

5. The method of claim 4, wherein the first voltage is less than the second voltage.

6. The method of claim 4, further comprising:
switching the frequency from the normal operating frequency to the less than normal operating frequency when the first control signal is received again; and
switching the frequency from the less than normal operating frequency to the normal operating frequency when the second control signal is received again.

* * * * *